(12) United States Patent
Mallet et al.

(10) Patent No.: US 12,228,245 B2
(45) Date of Patent: Feb. 18, 2025

(54) DEVICE FOR DETECTING LEAKS IN AN AIRCRAFT ENGINE LUBRICATING OIL CIRCUIT

(71) Applicant: SAFRAN AIRCRAFT ENGINES, Paris (FR)

(72) Inventors: Thibault Maxime Adrien Mallet, Moissy-Cramayel (FR); Nicolas Andrea Fabbro, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/572,031

(22) PCT Filed: Jun. 14, 2022

(86) PCT No.: PCT/FR2022/051145
§ 371 (c)(1),
(2) Date: Dec. 19, 2023

(87) PCT Pub. No.: WO2022/269165
PCT Pub. Date: Dec. 29, 2022

(65) Prior Publication Data
US 2024/0288117 A1    Aug. 29, 2024

(30) Foreign Application Priority Data
Jun. 21, 2021  (FR) ...................... 2106584

(51) Int. Cl.
*F16N 29/00* (2006.01)
*F02C 7/14* (2006.01)
(Continued)

(52) U.S. Cl.
CPC ............. *F16N 29/00* (2013.01); *F02C 7/14* (2013.01); *F02C 7/16* (2013.01); *F28F 27/00* (2013.01);
(Continued)

(58) Field of Classification Search
CPC ...... F16N 29/00; F16N 29/02; F05D 2260/98; F01M 11/10
See application file for complete search history.

(56) References Cited

U.S. PATENT DOCUMENTS 4,574,920 A * 3/1986 Callahan ................. F16N 7/32
184/39.1
5,038,893 A * 8/1991 Willner ................. F16N 29/00
184/7.4
(Continued)

FOREIGN PATENT DOCUMENTS

EP  3719278 A1  10/2020
FR  2691255 A1  11/1993
(Continued)

OTHER PUBLICATIONS

Search Report for International Application No. PCT/FR2022/051145 mailed Sep. 27, 2022.
(Continued)

*Primary Examiner* — Michael A Riegelman
(74) *Attorney, Agent, or Firm* — McDonald Hopkins LLC

(57) ABSTRACT

Leaks in an oil lubrication circuit, in particular through a heat exchanger communicating with another circuit, are measured by the movements of a piston that is sensitive to variations in flow rates and pressure drops at two calibrated ports on either side of the predicted location of the leak. In one intended application, the second circuit contains over-pressurised fuel which is used to constantly cool the oil.

7 Claims, 3 Drawing Sheets

Figure 1:
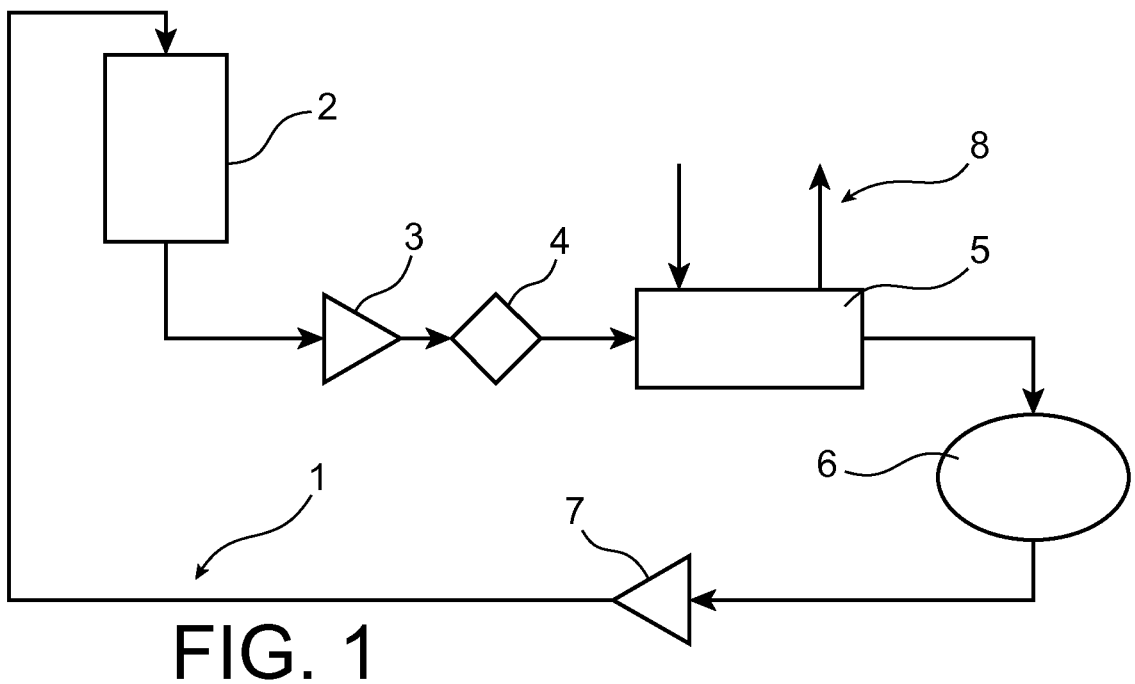

(51) Int. Cl.
*F02C 7/16* (2006.01)
*F28F 27/00* (2006.01)

(52) U.S. Cl.
CPC ...... *F05D 2260/80* (2013.01); *F05D 2260/98* (2013.01); *F16N 2210/08* (2013.01)

(56) References Cited

U.S. PATENT DOCUMENTS

| | | | | |
|---|---|---|---|---|
| 5,126,722 | A * | 6/1992 | Kamis | G01P 13/002 184/7.4 |
| 5,320,196 | A * | 6/1994 | Mouton | G01M 3/3227 184/104.1 |
| 5,711,615 | A * | 1/1998 | Stitz | F16C 33/667 384/473 |
| 8,596,417 | B2 * | 12/2013 | Barrett | F16N 29/04 184/6.4 |
| 10,961,880 | B2 * | 3/2021 | Karcher | F01M 1/02 |
| 11,466,599 | B2 * | 10/2022 | Rigouste | F16K 11/105 |
| 11,772,810 | B2 * | 10/2023 | Peyron | B64D 27/18 244/57 |
| 2019/0178119 | A1 * | 6/2019 | Karcher | B64D 33/00 |
| 2020/0317358 | A1 * | 10/2020 | Peyron | B64D 29/02 |
| 2024/0288117 | A1 * | 8/2024 | Mallet | F01M 11/10 |

FOREIGN PATENT DOCUMENTS

| | | |
|---|---|---|
| FR | 3068102 A1 | 12/2018 |
| FR | 3074848 A1 | 6/2019 |
| JP | S54183573 U | 12/1979 |
| JP | S54183574 U | 12/1979 |
| WO | 2012129898 A1 | 10/2012 |

OTHER PUBLICATIONS

Search Report for French Application No. 2106584 dated Feb. 16, 2022.

* cited by examiner

DEVICE FOR DETECTING LEAKS IN AN AIRCRAFT ENGINE LUBRICATING OIL CIRCUIT

CROSS-REFERENCE TO RELATED APPLICATIONS

This is the National Stage application of PCT international application PCT/FR2022/051145, filed on Jun. 14, 2022, which claims the priority of French Patent Application No. 2106584, filed Jun. 21, 2021, both of which are incorporated herein by reference in their entireties.

The present invention relates to a device for detecting leaks in a lubricating oil circuit of an aircraft engine.

The lubricating oil circuits of these engines involve a permanent circulation of oil in particular between lubricated enclosures, containing for example support bearings of the shafts, and storage tanks. This circulation allows evacuating the heat produced by frictions or proximity with the hot gases downstream of the combustion chamber by means of the oil flow. Heat exchangers are generally added to the equipment crossed by the circuits in order to obtain enough cooling to keep the oil at a stable temperature. The cooling fluid used in the exchanger is often the fuel used for the operation of the engine, thanks to its initial cold temperature: the fuel circuit then meets the oil circuit in the exchanger.

Leaks occur if the heat exchanger is damaged and communication opens between the two circuits. In the case of cooling with the fuel, the leaks normally occur towards the oil circuit, because the fuel circuit is at a higher pressure in conventional engines. The obvious drawbacks are a lubrication defect and a risk of spillage in the oil circuit, and of flow of the excess liquid in the engine, with inevitable pollution. If the liquid mixed with the oil is fuel, a failure in the operation of the engine might occur due to the subtraction of part of its fuel, and fuel fires might occur as it reaches excessively hot spots of the engine.

Known methods for detecting leaks are rather empirical and consist for example in examining the stability of the level in the oil reservoirs, checking the absence of fuel odours, or the absence of fires. Of course, such methods are neither very reliable, nor applicable during the operation of the engine and when the aircraft is flying. Overflow discharge devices have also been proposed in the oil reservoirs, but they are relatively complex, and they are activated only after a substantial amount of foreign liquid has leaked into the oil circuit. They are not necessarily designed to detect leaks, but rather to overcome their consequences. The documents FR 3068 102 and 3 074 848 A1, in particular, illustrate such devices.

An object of the invention is to provide a detection device that is active at all times, is capable of signalling a leak as soon as it starts, has simple construction and operation and therefore is barely subject to faults and anomalies, and does not require human observations.

In general terms, the invention therefore relates to a device for detecting leaks in a lubricating oil circuit of an aircraft engine between at least two points of the circuit, characterised in that it comprises a piston formed by a plurality of stepped plates on a movable rod which connects said plates, a plurality of fixed chambers in which the plates slide respectively by splitting each of them into two separate compartments, two calibrated ports located respectively at two distinct positions of the circuit, the two compartments of each of the chambers being respectively connected to the circuit by two respective and distinct connecting conduits leading to the circuit on either side of a calibrated port, the device further comprising a sensor for detecting the position or movement of the piston. Each of the two points of the circuit is present at the intersection of one of the connecting conduits with a main line of the circuit.

According to an application that is primarily considered, the circuit comprises a heat exchanger, and the calibrated ports are placed on either side of the exchanger along the circuit.

Advantageously, the position or movement sensor is connected to an anomaly diagnosis device, sensitive to a displacement of the rod off an equilibrium position.

According to a possible generalisation, the plates, the chambers and the calibrated ports are each at least three in number.

Advantageously, the piston is connected to a fixed location of the device by a return spring at an initial position of the piston.

Another aspect of the invention is an arrangement comprising the oil circuit and the leak detection device according to the foregoing, characterised in that the heat exchanger is also placed on a second circuit, through which a fluid flows in heat exchange with the oil.

The second circuit may be a fuel supply circuit of the aircraft engine.

Figure 2:
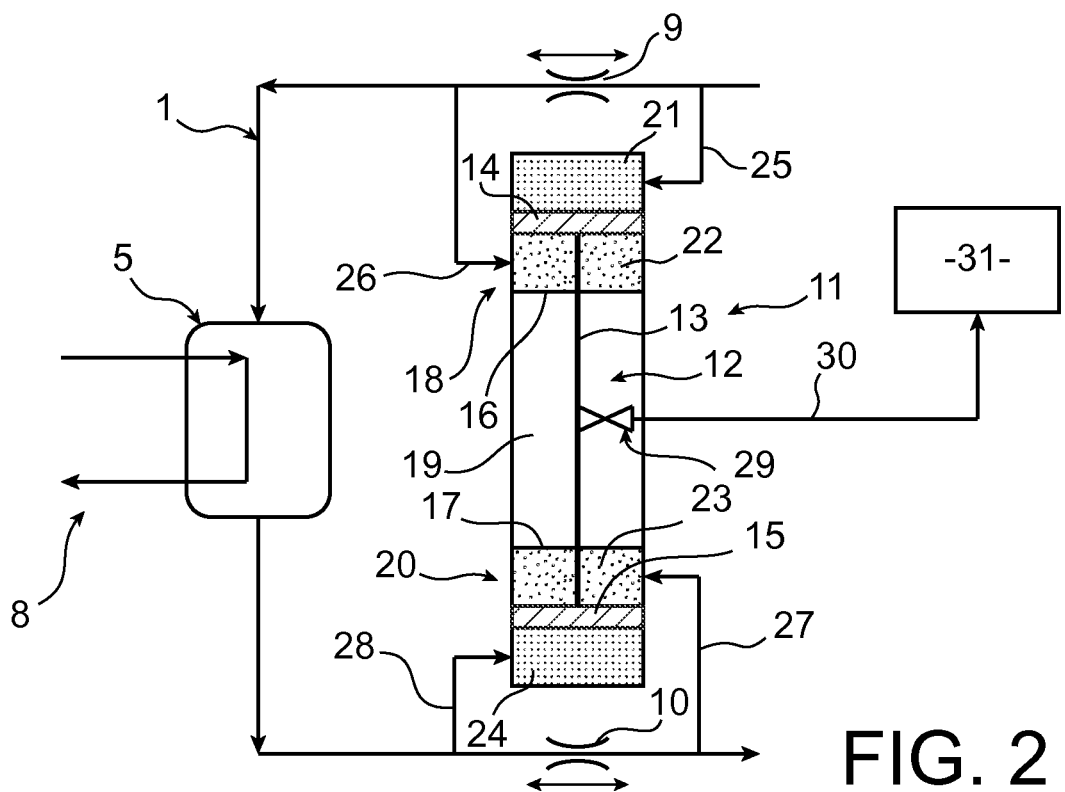
Figure 3:
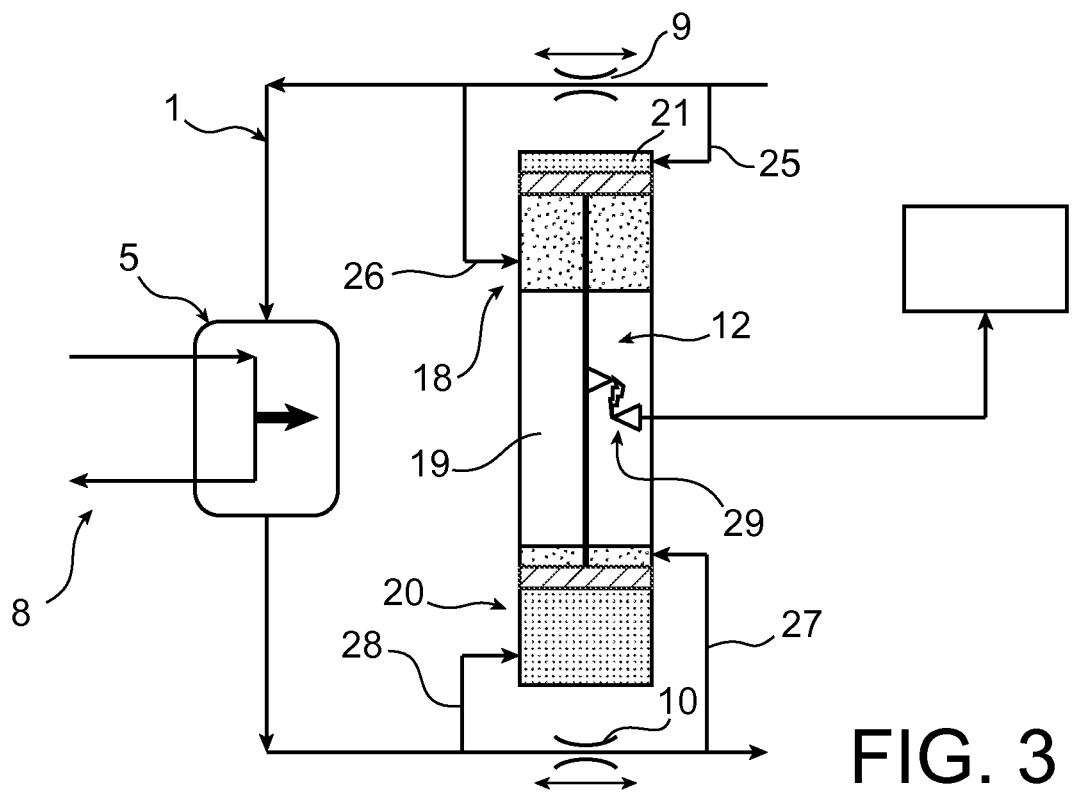
Figure 4:
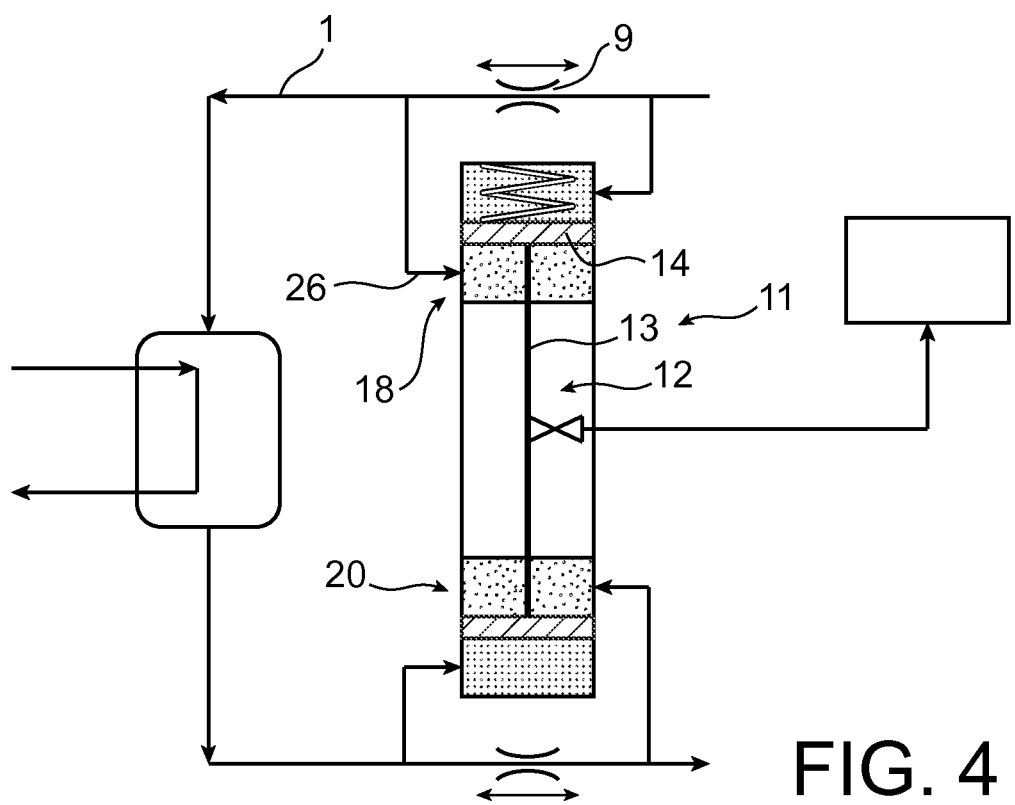
Figure 5:
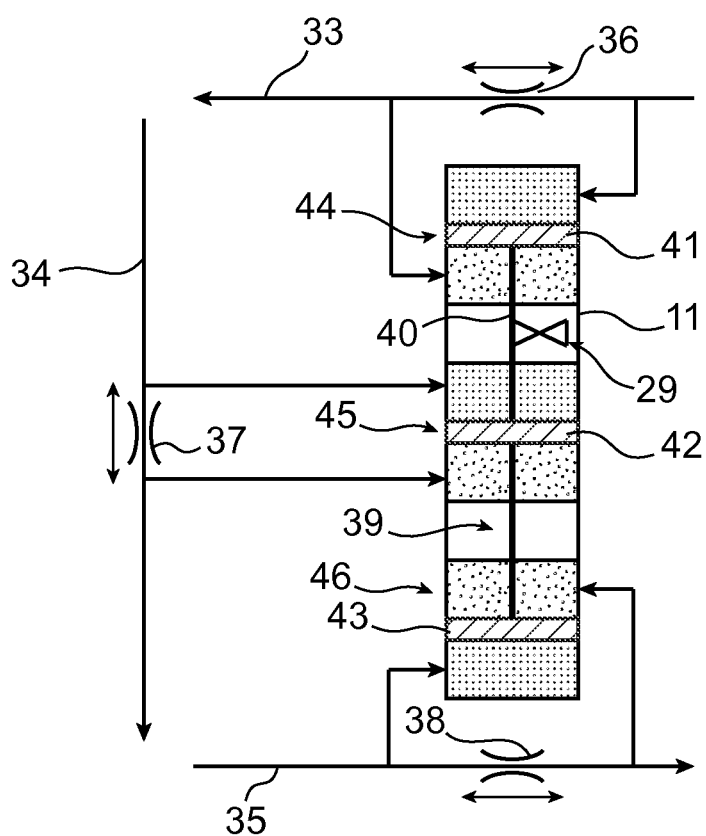

The invention will now be described in detail in its different aspects, features and advantages, by means of the following figures, which illustrate several of its possible embodiments, given merely for illustration:

FIG. 1: an oil lubrication circuit;
FIG. 2: an embodiment of the invention;
FIG. 3: this embodiment, when a leak occurs;
FIG. 4: a variant;
FIG. 5: another possible embodiment.

An aircraft engine lubricating oil circuit (this engine being actually known, and therefore not illustrated) is first schematised in FIG. 1. It comprises a closed-loop conduit 1, passing successively (according to the direction of circulation of the oil) by an oil storage reservoir 2, a first pump 3, a filter 4, a heat exchanger 5, an enclosure 6 of the engine to be lubricated, and a second oil pump 7. The enclosure 6 may be closed, communicate on the outside only by sealing gaskets with a very low leakage flow rate, or communicate with other enclosures under overpressure and a dry atmosphere, such that the entire circuit could be considered as closed: the amount of oil contained therein should remain constant or almost constant.

The heat exchanger 5 is intended to cool the oil, and a second cold fluid circuit 8 passes therethrough, which may be fuel under pressure. Fuel could leak into the conduit 1 and accumulate in the oil circuit, until spillage out of the reservoir 2 or other damages occur, if the wall of the heat exchanger 5 that separates the two circuits (most often, a group of parallel tubes in each of which a flow of the fuel flows) is pierced.

A first embodiment of the invention is described in FIG. 2. The conduit 1 is equipped, upstream and downstream of the heat exchanger 5, with two calibrated ports 9 and 10. A calibrated port is a restriction in the section of a conduit, which produces a well-defined pressure drop according to the flow rate of the fluid passing through, and which can be used, for this purpose, as a flow meter. A cylindrical casing 11 is also present, and a piston 12 slides therein along its axis. The piston 12 comprises a central rod 13, and two plates 14 and 15 at the ends of the rod 13. Two walls 16 and 17 split the inner volume of the casing 11 into three successive chambers 18, 19 and 20 along the axis of the cylinder. The rod 13 slides through the walls 16 and 17, and the plates 14 and 15 move respectively in the extreme chambers 18 and 20, by splitting each of them into two compartments, 21 and 22 for the chamber 18, and 23 and 24 for the chamber 20. More specifically, the compartments 21 and 22 occupy the entire volume of the chamber 18 except the volume occupied by the piston 12, and, similarly, the compartments 23 and 24 occupy the entire volume of the chamber 20, except the volume occupied by the piston 12; and the plates 14 and 15 hermetically separate, respectively, the compartments 21 and 22 from one another, and 23 and 24 from one another.

Each of the compartments 21 to 24 is connected to the conduit 1 by a connecting conduit, respectively, 25 to 28, as follows. The compartment 21, which is distal or adjacent to one end of the casing 11, has its connecting conduit 25 which leads to the conduit 1 of the circuit upstream of the first calibrated port 9, itself upstream of the heat exchanger 5. The compartment 22, which is adjacent to the middle chamber 19 and adjacent to the previous one, has its connecting conduit 26 which leads to the conduit 1 downstream of the first calibrated port 9, but still upstream of the heat exchanger 5. The compartment 23, which is another proximal compartment adjacent to the middle chamber 19, but belonging to the second extreme chamber 20, has its connecting conduit 27 which leads to the conduit 1 downstream of the second calibrated port 10; and the compartment 24, which is the distal compartment of the second extreme chamber 20, located at the end of the casing 11 opposite to the previous one, has its connecting conduit 28 which leads to the conduit 1 also downstream of the heat exchanger 5, but upstream of the second calibrated port 10. In a more synthetic manner, each of the chambers 18 and 20 split by one of the plates 14 and 15 is associated with a respective calibrated port 9 or 10, their compartments communicate on either side of said associated calibrated port 9 or 10, the distal compartments 21 and 24, all on the same side (upstream or downstream) of the associated calibrated port 9 or 10, and the proximal compartments 22 and 23, all on the other side. Hence, each of the compartments 21 to 24 is occupied by the oil of the circuit, at a pressure equal to that of the point of the circuit where their connecting conduit leads, the pressure drops in the connecting conduits 25 to 28 being negligible, or in any case equal to one another.

Finally, the device comprises a sensor 29 for detecting the position of the rod 13, and possibly its movement, inside the middle chamber 19, which is not occupied by a liquid; an electric line 30 connects the sensor 29 to a computer 31 onboard the aircraft and sends its measurements thereto.

FIG. 3 helps understanding the operation of the device in comparison with FIG. 2 When the oil circuit is intact and does not receive any leaks originating from the second circuit 8 (or does not undergo leaks itself to the outside), the flow rate passing through it remains constant, and the pressure drops through the calibrated ports ΔR9 and ΔR10 are identical if these calibrated ports 9 and 10 are themselves identical. The pressure forces exerted on the two plates 14 and 15, respectively proportional to these pressure losses, are identical if the plates 14 and 15 have the same surface area, but they are opposite one another, and the piston 12 remains immobile. Yet, in the event of a leak, the state of FIG. 3 is obtained, because the flow rates become different on either side of the heat exchanger 5 (or more generally from the location of the leak), the pressure drops also become different through the calibrated ports 9 and 10, as well as the opposing forces exerted on the plates 14 and 15: the piston 12 moves. The position sensor 29 observes this movement and emits a corresponding signal to the computer 31, which could trigger an alarm or command a cut-off of the circuit or of the engine.

It is obvious that the same effect could be obtained with different or more complex embodiments based on the previous description, yet without departing from the limits of the invention. Nevertheless, mention may be made of two major possibilities of improvement hereinafter. FIG. 4 illustrates the addition of a spring 32 constrained between the casing 11 and the piston 12 in the direction of movement of the piston 12, and intended to return the latter back to the starting position, corresponding to equilibrium in the absence of leakage, i.e. the state of FIG. 2, when it has been moved by a disturbance that has stopped. And FIG. 5 illustrates a device designed for a circuit with three successive or parallel portions of branches 33, 34 and 35, each provided with a calibrated port, respectively 36, 37 and 38. The device then comprises, in the casing 11, a piston 39 whose rod 40 carries three successive plates 41, 42 and 43 and each of which slides in a respective chamber 44, 45 or 46 occupying a portion of the length of the casing 11. Like before, each of the chambers is split into two hermetic compartments by the plate contained therein, and each of the compartments communicates with the circuit, respectively upstream and downstream of one of the calibrated ports 36, 37 and 38, with which it is respectively associated. An equilibrium state may be obtained through the proper selection of the sections of the chambers, which could be different (the casing 11 then being replaced by a superposition of cylinders) and pressure drops by the calibrated ports, which may be different, also according to the flow rates, which may also be different, intended to flow into each of the branches. Like before, a leak in one of the branches will produce an imbalance in the forces and a displacement of the piston, which will be detected by the position sensor 29. Such a device can allow detecting some leaks more finely according to their position, and even distinguishing between some leakage positions, for example between the upstream and the downstream of the median calibrated port 37 if the branches 33, 34 and 35 are successive, if the directions of movement of the piston 39 are then opposite.

The invention claimed is:

1. A device for detecting leaks in a lubricating oil circuit of an aircraft engine between at least two points of the circuit, the device comprising a piston formed by a plurality of plates stepped over a movable rod which connects said plates, a plurality of fixed chambers in which the plates slide respectively by splitting each of them into two separate compartments, two calibrated ports located respectively at two distinct positions of the circuit, the two compartments of each of the chambers being respectively connected to the circuit by two respective and distinct connecting conduits leading to the circuit on either side of a calibrated port, the device further comprising a sensor (29) for detecting the position or movement of the piston.

2. The leak detection device according to claim 1, wherein the circuit comprises a heat exchanger, and the calibrated ports are placed on either side of the exchanger along the circuit.

3. An arrangement comprising the oil circuit and the leak detection device according to claim 2, wherein the heat exchanger is also placed on a second circuit, through which a fluid flows in heat exchange with the oil.

4. The arrangement according to claim 3, wherein the second circuit is a fuel supply circuit of the aircraft engine.

5. The leak detection device according to claim 1, wherein the position or movement sensor is connected to an anomaly diagnosis device, sensitive to a displacement of the rod out of an equilibrium position.

6. The leak detection device according to claim 1, wherein the plates, the chambers and the calibrated ports are each at least three in number.

7. The leak detection device according to claim 1, wherein the piston is connected to a fixed location of the device by a return spring (32) at an initial position of the piston.

* * * * *